United States Patent
Shoeibi

(10) Patent No.: US 11,055,326 B2
(45) Date of Patent: Jul. 6, 2021

(54) METHOD FOR INDEXING AND RETRIEVING TEXT FOR ADDING TEXT IDENTIFIER AS AN ADHESIVE TO TEXT BODY OF PHYSICAL PAGE IMPLEMENTED IN AN ADHESIVE PAGE MARKER AND STICKER SYSTEM

(71) Applicant: Lisa Shoeibi, Round Rock, TX (US)

(72) Inventor: Lisa Shoeibi, Round Rock, TX (US)

( * ) Notice: Subject to any disclaimer, the term of this patent is extended or adjusted under 35 U.S.C. 154(b) by 0 days.

(21) Appl. No.: 17/006,164

(22) Filed: Aug. 28, 2020

(65) Prior Publication Data

US 2021/0064641 A1 Mar. 4, 2021

Related U.S. Application Data

(60) Provisional application No. 62/894,386, filed on Aug. 30, 2019.

(51) Int. Cl.
| | |
|---|---|
| G06F 3/12 | (2006.01) |
| G06F 16/31 | (2019.01) |
| G06F 16/34 | (2019.01) |
| B42F 21/06 | (2006.01) |
| B42D 3/00 | (2006.01) |
| G06K 9/00 | (2006.01) |
| G06F 16/958 | (2019.01) |

(52) U.S. Cl.
CPC ............ G06F 16/31 (2019.01); B42D 3/006 (2013.01); B42F 21/06 (2013.01); G06F 3/1204 (2013.01); G06F 3/1243 (2013.01); G06F 16/345 (2019.01); G06F 3/125 (2013.01); G06F 16/986 (2019.01); G06K 9/00449 (2013.01); G06K 2209/501 (2013.01)

(58) Field of Classification Search
None
See application file for complete search history.

(56) References Cited

U.S. PATENT DOCUMENTS

| | | | |
|---|---|---|---|
| 6,430,376 B1 * | 8/2002 | Yamamoto | G03B 17/48 355/40 |
| 2005/0195975 A1 * | 9/2005 | Kawakita | H04L 9/0825 380/30 |
| 2006/0130977 A1 * | 6/2006 | Takahashi | B41J 3/4075 156/510 |
| 2007/0070441 A1 * | 3/2007 | Yumita | G06K 15/1893 358/450 |
| 2009/0174910 A1 * | 7/2009 | Kuraki | H04N 1/387 358/3.28 |
| 2010/0079800 A1 * | 4/2010 | Muto | G06F 3/1259 358/1.15 |

(Continued)

Primary Examiner — Haris Sabah

(57) ABSTRACT

A method for indexing and retrieving text that includes affixing a first text identifier adjacent to a first body of text, the first body of text is included in a physical collection of text, the first text identifier that includes a first iconography; affixing a first page identifier adjacent to a page included in the physical collection of text, the page includes the particular body of text, the first page identifier includes the first iconography; and modifying a list to include a first summary of the first body of text, the list include a table of cells arranged into rows and columns, each of the rows is associated with one of a plurality of iconographies, the plurality of iconographies includes the first iconography, each iconography is associated with one indexing item.

19 Claims, 8 Drawing Sheets

(56) References Cited

U.S. PATENT DOCUMENTS

2012/0023447 A1* 1/2012 Hoshino ............... G06F 40/211
715/823
2012/0105888 A1* 5/2012 Nakayama ......... G03G 15/5025
358/1.13

* cited by examiner

METHOD FOR INDEXING AND RETRIEVING TEXT FOR ADDING TEXT IDENTIFIER AS AN ADHESIVE TO TEXT BODY OF PHYSICAL PAGE IMPLEMENTED IN AN ADHESIVE PAGE MARKER AND STICKER SYSTEM

CROSS-REFERENCE TO RELATED APPLICATIONS

This application claims priority to U.S. Provisional Application No. 62/894,386 filed Aug. 30, 2019, which is hereby incorporated herein by reference.

FIELD OF THE INVENTION

The present disclosure relates generally to indexing systems. More specifically, the present disclosure describes methods for indexing and retrieving text.

BACKGROUND OF THE INVENTION

Information retrieval is the activity of obtaining information system resources that are relevant to an information need from a collection of those resources. Searches can be based on full-text or other content-based indexing. Information retrieval includes the science of searching for information in a document, searching for documents themselves, and also searching for the metadata that describes data, and for databases of texts, images or sounds. Subject indexing is the act of describing or classifying a document by index terms or other symbols in order to indicate what the document is about, to summarize its content or to increase its findability. In other words, it is about identifying and describing the subject of documents. Indexes can be constructed, separately, on three distinct levels: terms in a document such as a book; objects in a collection such as a library; and documents (such as books and articles) within a field of knowledge.

BRIEF DESCRIPTION OF THE DRAWINGS

Some of the embodiments will be described in detail, with reference to the following figures, wherein like designations denote like members, wherein.

Figure 1:
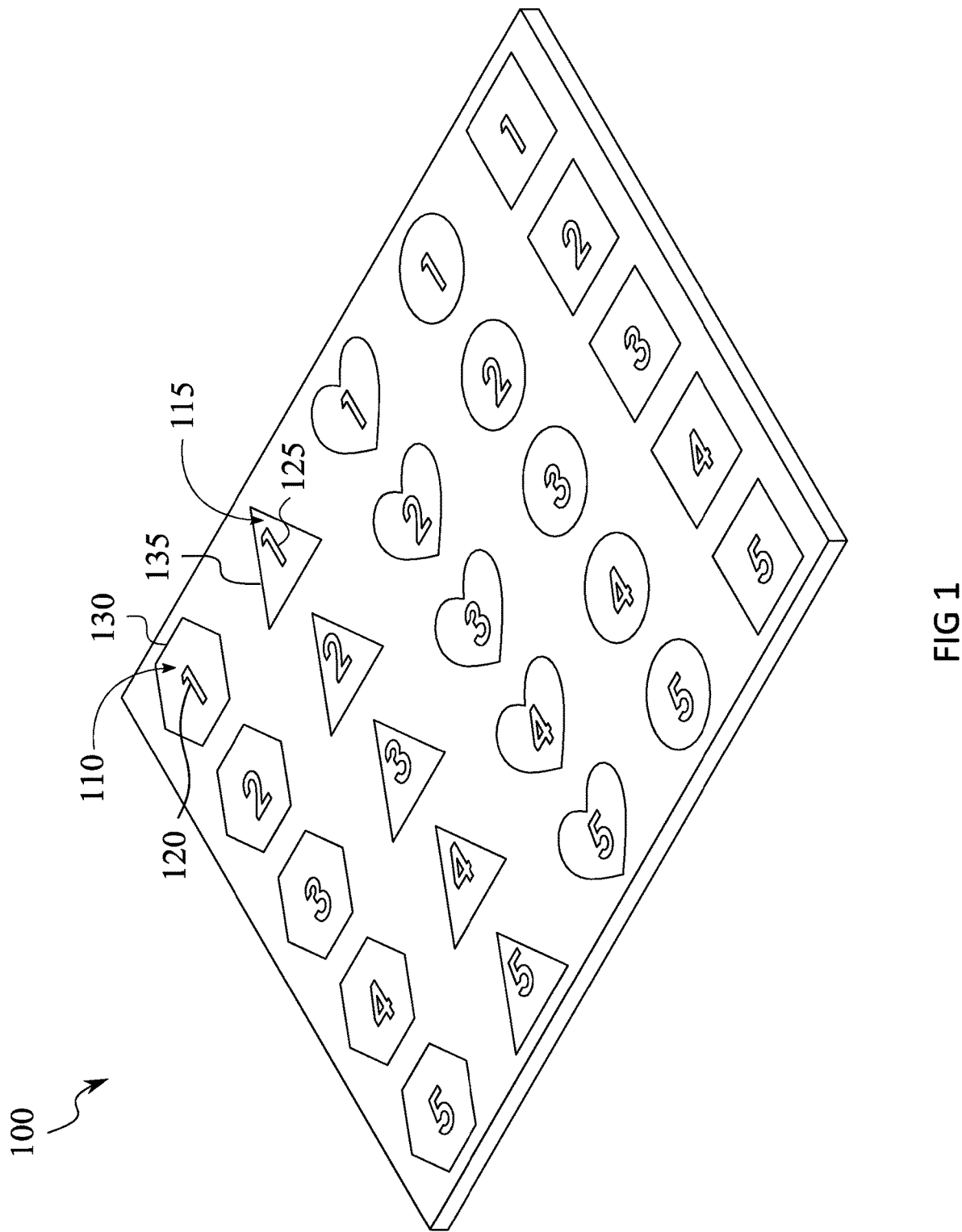
FIG. 1 depicts a first sheet, according to some embodiments.

Unless otherwise specifically noted, articles depicted in the drawings are not necessarily drawn to scale.

DETAIL DESCRIPTIONS OF THE INVENTION

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods.

Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

The present disclosure includes many aspects and features. Moreover, while many aspects and features relate to, and are described in the context of the indexing and retrieval of text, embodiments of the present disclosure are not limited to use only in this context.

Information retrieval is the activity of obtaining information system resources that are relevant to an information need from a collection of those resources. Searches can be based on full-text or other content-based indexing. Information retrieval includes the science of searching for information in a document, searching for documents themselves, and also searching for the metadata that describes data, and for databases of texts, images or sounds. Subject indexing is the act of describing or classifying a document by index terms or other symbols in order to indicate what the document is about, to summarize its content or to increase its findability. In other words, it is about identifying and describing the subject of documents.

Indexes can be constructed, separately, on three distinct levels: terms in a document such as a book; objects in a collection such as a library; and documents (such as books and articles) within a field of knowledge. Embodiments disclosed herein seek to provide methods for the indexing of text that is included in a physical collection of text. As used herein, "physical collection of text" refers to books and periodicals (e.g., newspapers, journals, newsletters, magazines, and similar serial publications that appear in a new edition on a regular basis). Embodiments of the instant application seek to disclose methods for retrieving the indexed text.

In preferred embodiments, the method includes the use of a first sheet 100, a second sheet 200, and a third sheet 300. The method can also include the use of a fourth sheet 400. The first sheet 100, the second sheet 200, the third sheet 300, and/or the fourth sheet 400 ("the sheets") each preferably include a plurality of printed paper, plastic, vinyl, or other material that has pressure sensitive adhesive on one side (e.g., stickers, adhesive labels, adhesive notices, etc.). For example, the pressure sensitive adhesive can be used for temporary or permanent attachment. The sheets can each be or include any colors, shapes, and/or sizes to facilitate one or more embodiments disclosed herein. As depicted in FIG. 1, the first sheet 100 preferably includes a plurality of text identifiers (e.g., text identifiers 110 and text identifiers 115) on the pressure sensitive adhesive on one side.

Figure 2:
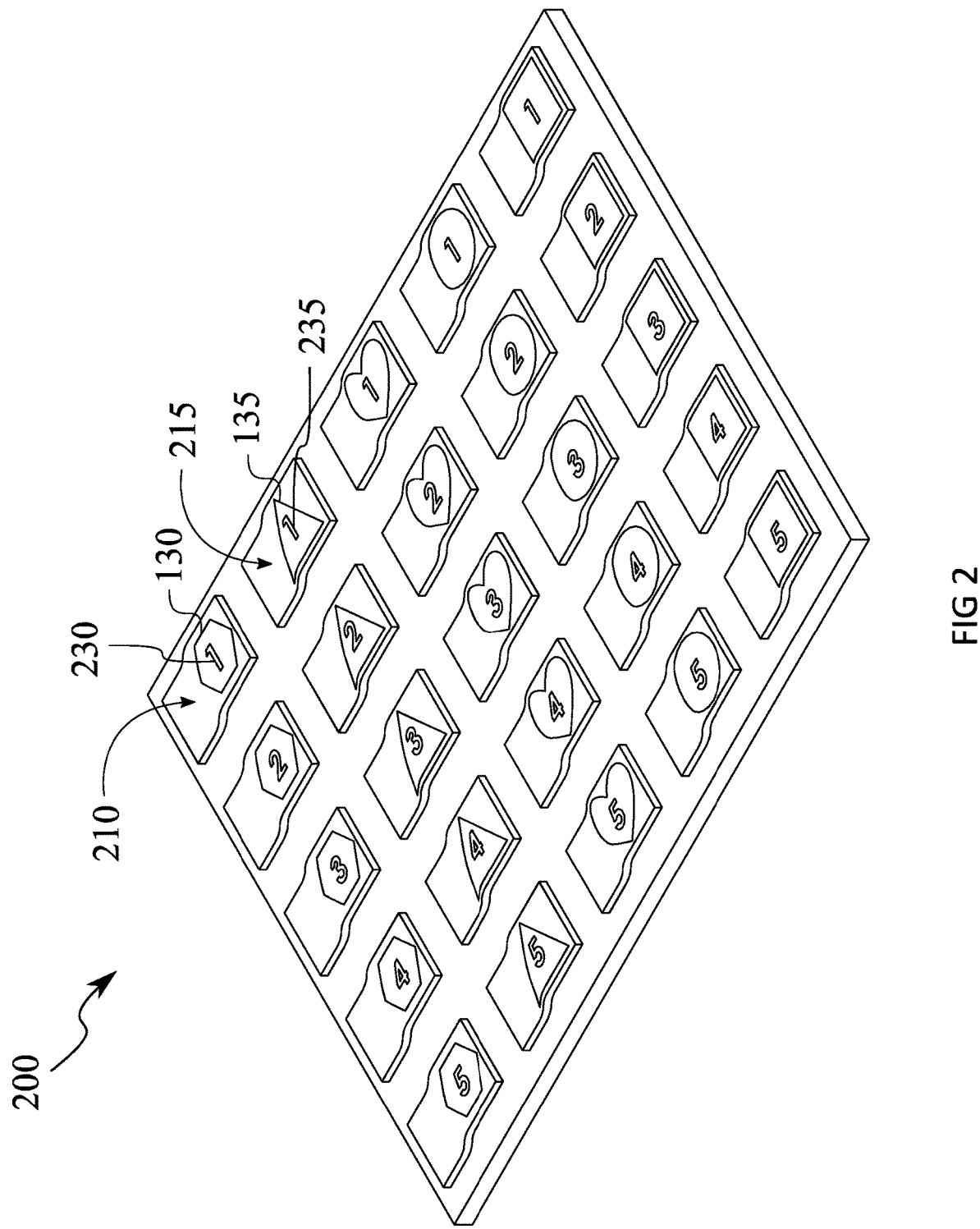
FIG. 2 depicts a second sheet, according to other embodiments.

For example, each text identifier 110 includes an enumeration 120 and each text identifier 115 includes an enumeration 125. Each set of text identifiers preferably includes a specific iconography (e.g., a specific shape and/or color). For example, each text identifier 110 includes an iconography 130, which is hexagonal in shape. Similarly, each text identifier 115 includes an iconography 135, which is triangular in shape. FIG. 2 depicts the second sheet, generally 200, according to certain embodiments. The second sheet 200 preferably includes a plurality of page identifiers (e.g., page identifiers 210 and page identifiers 215). For example, each page identifier 210 includes an enumeration 230 and each page identifier 215 includes an enumeration 235. Each set of page identifiers preferably includes a specific iconography (e.g., a specific shape and/or color).

Figure 3:
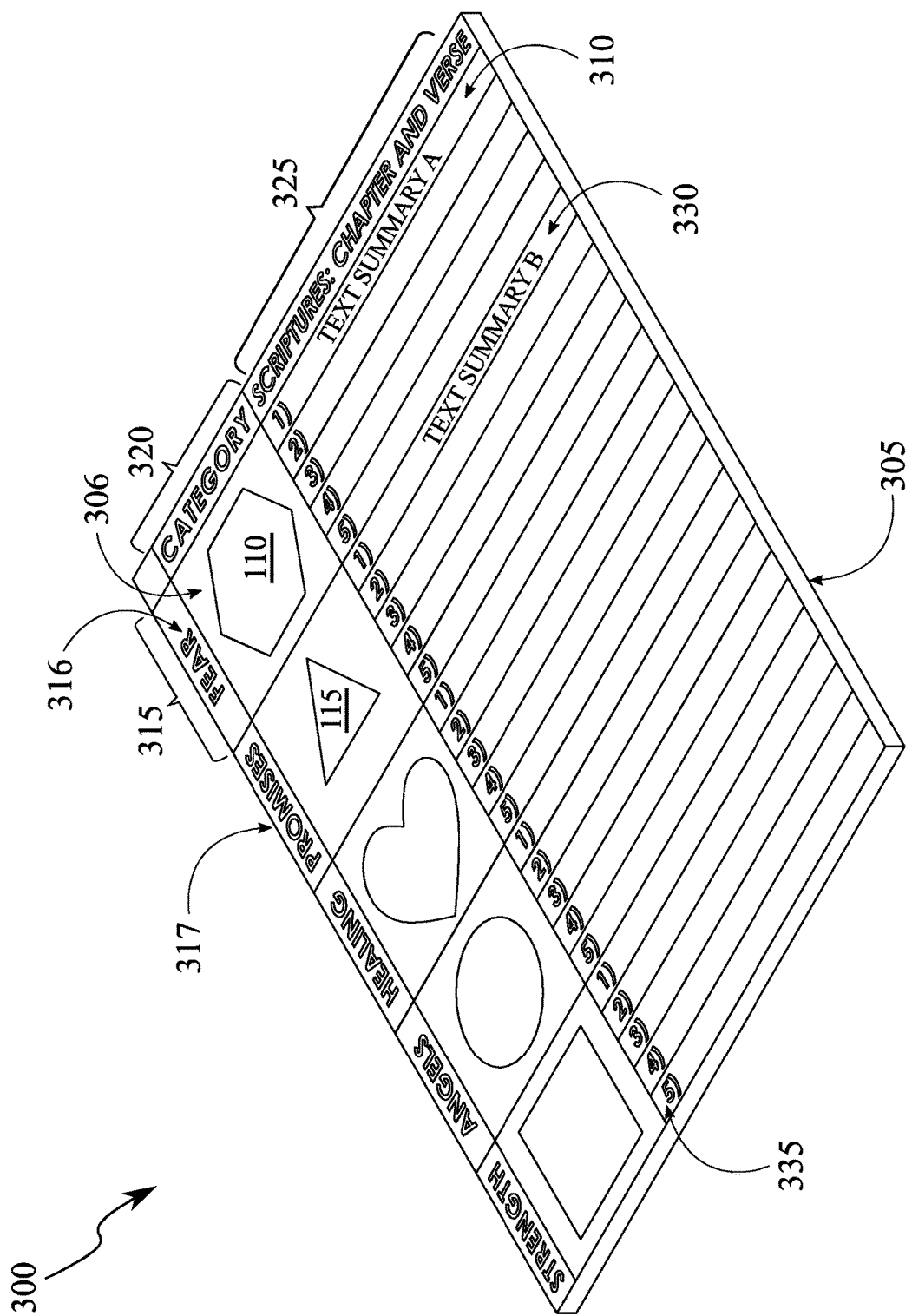
FIG. 3 depicts a third sheet, according to certain embodiments.

For example, each page identifier 210 includes an iconography 130 and each page identifier 215 includes an iconography 135. In other words, text identifiers and page identifiers that have the same iconography and enumerations are configured to be used together. FIG. 3 depicts third sheet, generally 300, according to other embodiments. The third sheet 300 preferably includes a list 305, which includes a table of cells 306 arranged into rows (e.g., rows 315) and columns (e.g., columns 320 and 325). In other embodiments, a row 315 can include one or more subordinated rows. Some rows are used to store text summaries (e.g., text summary 310 and text summary 330). Some rows include enumerations 335. In preferred embodiments, each row is associated with an iconography (e.g., the iconography 110 and the iconography 115). Here, each iconography (e.g., the iconography 110) is associated with an indexing item 316 (e.g., fear, promises, healing, angels, strength). In preferred embodiments, each row is enumerated (i.e. includes an enumeration 330) to coincide with the enumeration of a particular text identifier and page identifier. For example, text summary 310 ("TEXT SUMMARY A") coincides with the enumerations 120 and 230 of the text identifier 110 and the 210 page.

Figure 4:
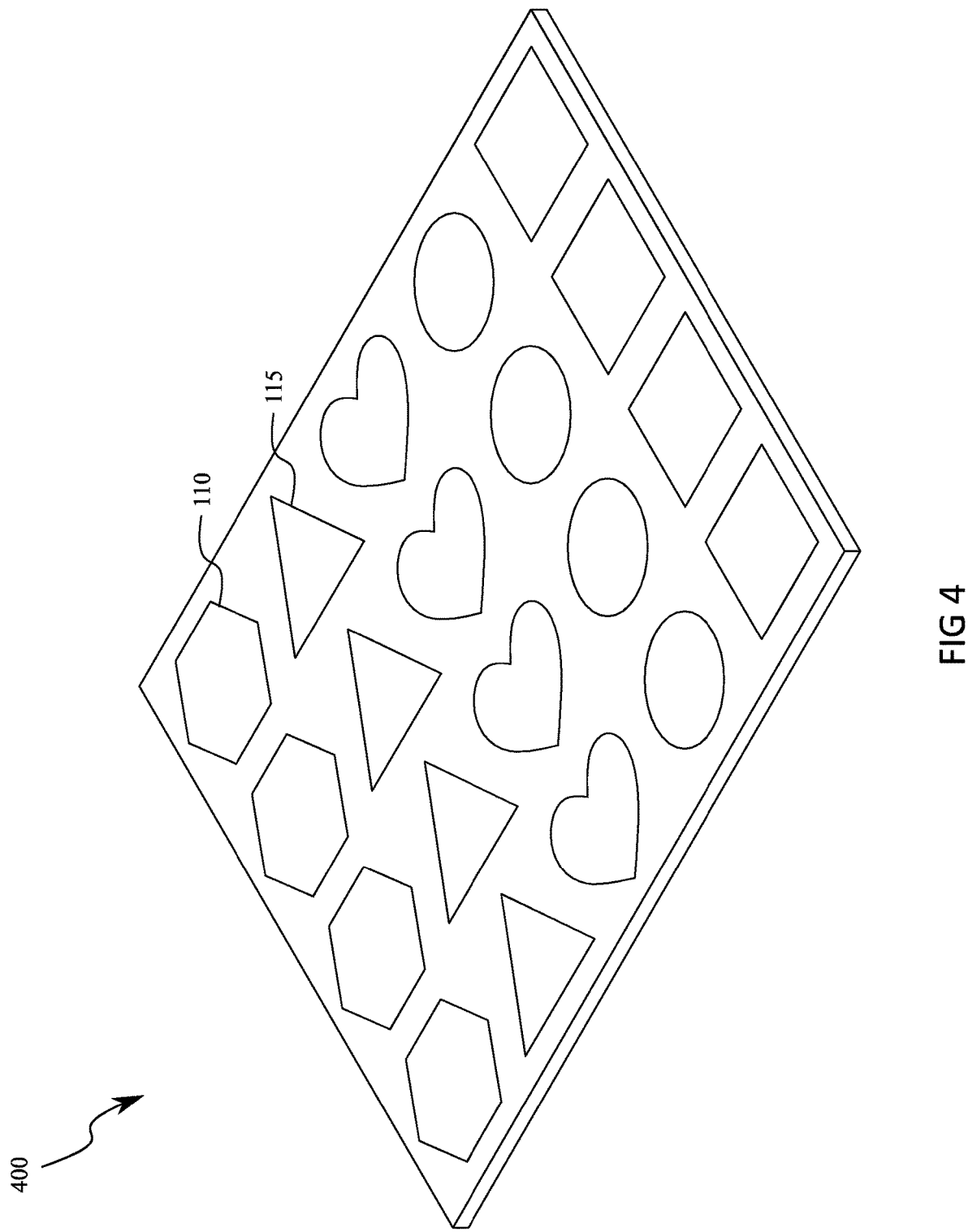
FIG. 4 depicts a fourth sheet, according to yet still other embodiments.
Figure 5:
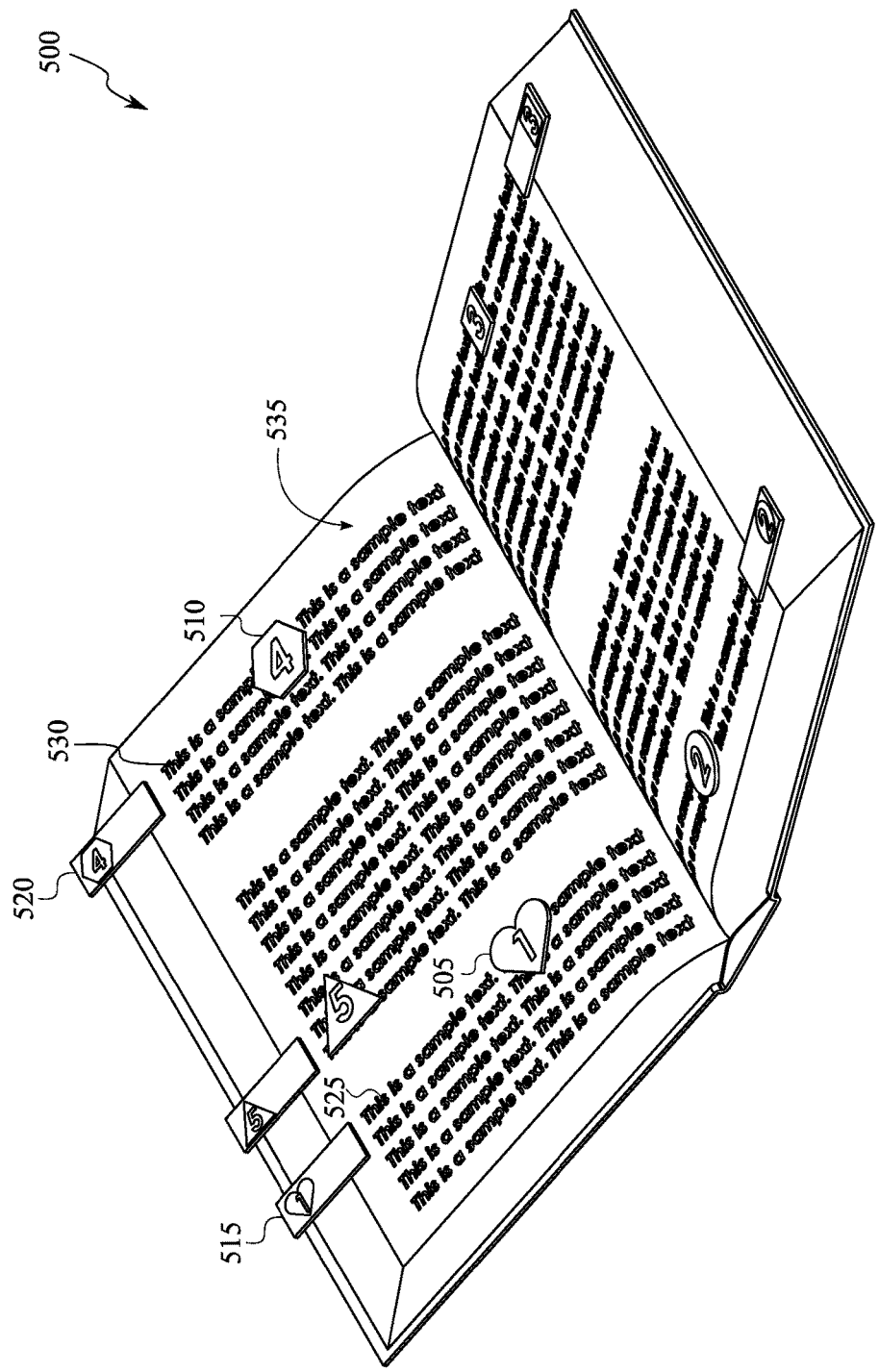
FIG. 5 depicts a physical collection of text as well as text identifiers and page identifiers affixed thereto, according to some embodiments.
Figure 6:
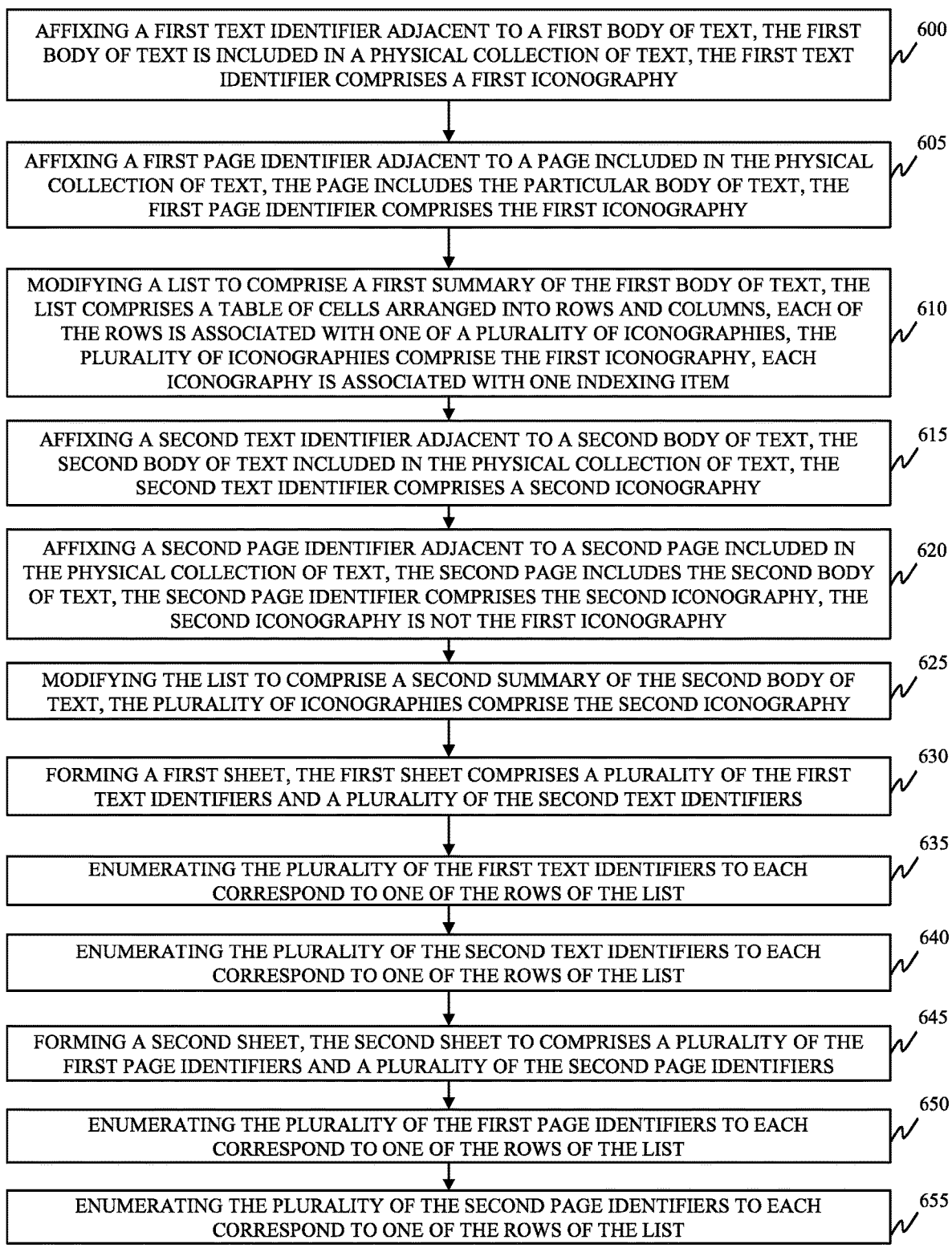
FIG. 6 depicts process steps of a method for indexing and retrieving text, according to other embodiments.
Figure 7:
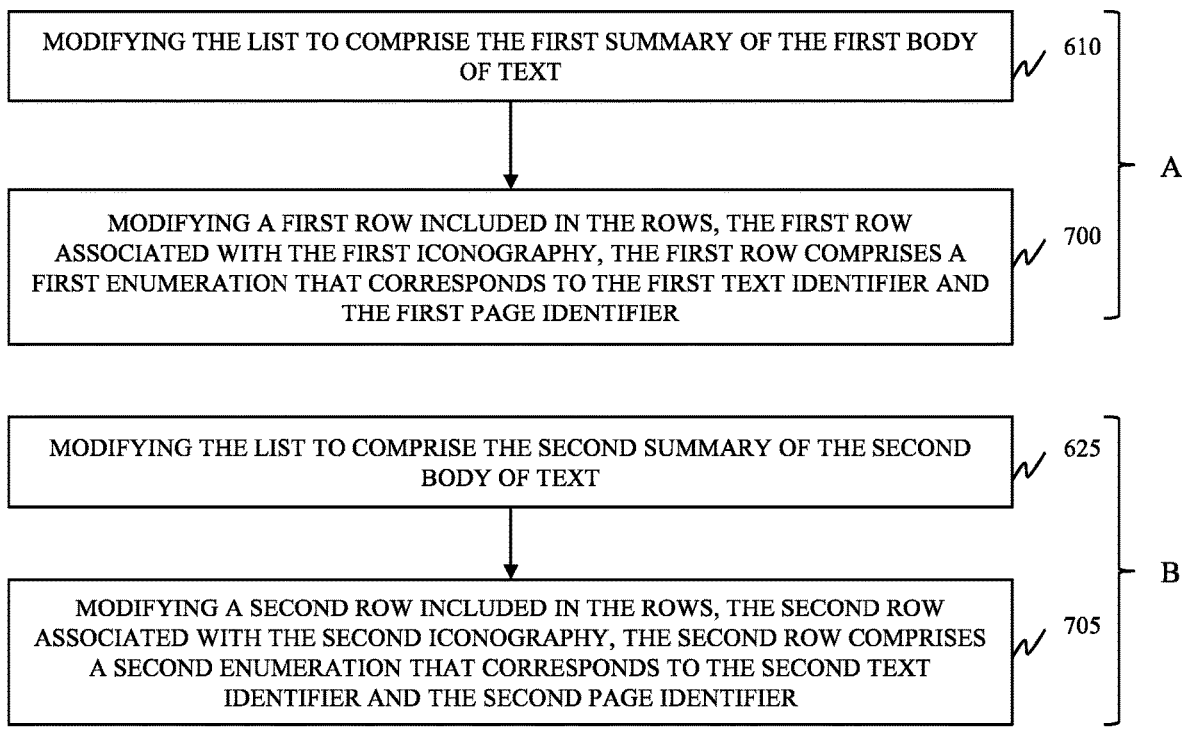
FIG. 7 depicts process steps of a method for indexing and retrieving text, according to certain embodiments.
Figure 8:
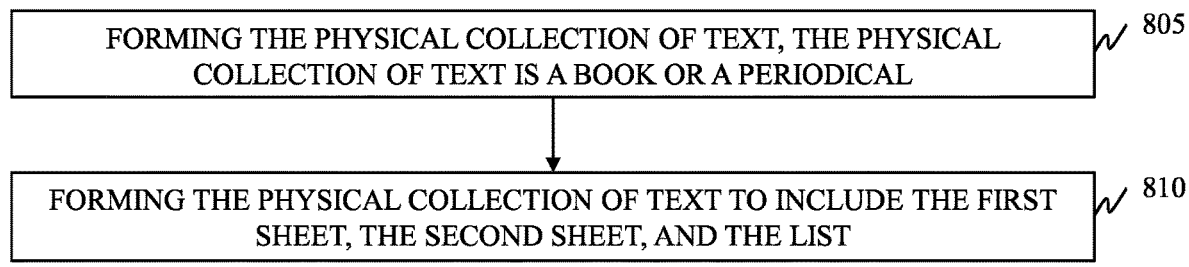
FIG. 8 depicts process steps of a method for indexing and retrieving text, according to yet still other embodiments.

FIG. 4 depicts a fourth sheet, generally 400, according to certain embodiments. The fourth sheet 400 preferably includes the same iconographies as the first sheet 100 and the second sheet 200 (e.g., the iconography 110 and the iconography 115). The iconographies included in the fourth sheet 400 can be affixed to the list 305 to associate the indexing item 316 with a particular iconography (e.g., the iconography 110). For example, iconography 115 is preferably affixed to the list 305 to thereby associate the iconography with indexing item 317. Hence, text identifiers (e.g., the text identifier 110) and page identifiers (e.g., the page identifier 210) that each include, for example, the iconography 110 are associated with the indexing item 316. The text identifiers and the page identifiers that have the same enumerations are related.

FIGS. 5-8 are utilized herein to depict the process steps of a method to enable indexing and retrieval of text, according to other embodiments. To be sure, the process steps described herein may be modified by substituting, reordering, or adding step to the disclosed methods. As used herein, text identifiers 510 and 505 are text identifiers that perform the same function(s) as text identifiers 110 and 115 (e.g., each text identifier includes an iconography and enumeration). Page identifiers 515 and 520 are page identifiers that perform the same function(s) and includes the same components as the page identifiers 210 and 215 (e.g., each page identifier includes an iconography and enumeration). The text identifier 505 and the page identifier 515 each include the same iconography (e.g., a heart) and enumeration (e.g., "1"). Similarly, the text identifier 510 and the page identifier 520 each include the same iconography (e.g., a hexagon) and enumeration (e.g., "4"). At Step 600, a first text identifier (e.g., the text identifier 505) is affixed adjacent to a first body of text (e.g., text 525), the first body of text is included in a physical collection of text 500, and the first text identifier comprises a first iconography (i.e. the heart shape). At Step 605, a first page identifier is affixed adjacent to a page 535 included in the physical collection of text 535, the page 535 includes the first body of text, and the first page identifier comprises the first iconography. At Step 610, a list 305 is modified to include a first summary of the first body of text (e.g., similar to the text summary 330), the list 305 is a table of cells arranged into rows (e.g., row 315) and columns (e.g., columns 320 and 325). Here, each of the rows is associated with one of a plurality of iconographies (e.g., the iconography 110 and the iconography 115). The plurality of iconographies include the first iconography and each is associated with an indexing item (e.g., indexing item 316 and indexing item 317).

At step 615, a second text identifier (e.g., the text identifier 510) is affixed adjacent to a second body of text (e.g., text 530), the second body of text included in the physical collection of text, and the second text identifier includes a second iconography (e.g., the hexagon shape). At Step 620, a second page identifier is affixed adjacent to a second page (e.g., the page 535 or another page) included in the physical collection of text, the second page includes the second body of text, the second page identifier includes the second iconography, and the second iconography is not the first iconography. In embodiments where the same iconography is shared by the first iconography and the second iconography, each would include a different enumeration. At Step 625, the list 305 is modified to include a second summary of the second body of text (e.g., the text summary 310), the plurality of iconographies comprise the second iconography. At Step 630, a first sheet (e.g., the sheet 100) is formed that includes a plurality of the first text identifiers (e.g., the text identifiers 110) and a plurality of the second text identifiers (e.g., the text identifiers 115). At Step 635, each of the plurality of the first text identifiers are enumerated (e.g., include enumerations 120) to correspond to one of the rows 315 of the list 305.

At Step 640, each of the plurality of the second text identifiers (e.g., the text identifiers 115) are enumerated (e.g., include enumerations 125) to correspond to one of the rows 315 of the list 305. At Step 645, a second sheet (e.g., the sheet 200) is formed that includes a plurality of the first page identifiers (e.g., the page identifiers 210) and a plurality of the second page identifiers (e.g., the page identifiers 215). At Step 650, each of the plurality of the first page identifiers are enumerated (i.e. each includes an enumeration 230) to correspond to one of the rows 315 of the list 305. At Step 655, each of the plurality of the second page identifiers are enumerated (i.e. each includes an enumeration 235) to correspond to one of the rows 315 of the list 305.

In some embodiments, at Step 700, a first row (e.g., the row that includes text summary 330) included in the rows is modified to accomplish Step 610. Here, the first row is associated with the first iconography and the first row includes a first enumeration (e.g., "1") that corresponds to the first text identifier and the first page identifier, as depicted in FIG. 7A. To retrieve the text associated with a text summary, the page identifier that shares the same iconography and enumeration as the text summary is located. Next, the text associated with the text summary is retrieved when the text identifier that shares the same iconography and enumeration as the page identifier is located.

In certain embodiments, at Step 705, a second row (e.g., the row that includes the text summary 310) included in the rows 315 is modified to accomplish Step 625, the second row associated with the second iconography, the second row comprises a second enumeration (e.g., "4") that corresponds to the second text identifier and the second page identifier, as depicted in FIG. 7B. To be sure, different iconographies can each include the same enumeration since each iconography is associated with a particular indexing item. In other embodiments, the physical collection of text 500 is formed to be a book or a periodical at Step 805. At Step 810, the physical collection of text 500 is formed to at least include the first sheet 100, the second sheet 200 and the third sheet 300 (i.e. the list 305). In other words, the physical collection of text 500 can include the first sheet 100, the second sheet 200 and the third sheet 300 to facilitate the indexing and retrieval of information included therein.

Although the disclosure has been explained in relation to its preferred embodiment, it is to be understood that many other possible modifications and variations can be made without departing from the spirit and scope of the disclosure.

What is claimed is:

1. A method for indexing and retrieving text, comprising:
affixing a first text identifier adjacent to a first body of text, the first body of text is included in a physical collection of text, the first text identifier comprises a first iconography;
affixing a first page identifier adjacent to a page included in the physical collection of text, the page includes the particular body of text, the first page identifier comprises the first iconography;
modifying a list to comprise a first summary of the first body of text, the list comprises a table of cells arranged into rows and columns, each of the rows is associated with one of a plurality of iconographies, the plurality of iconographies comprise the first iconography, each iconography is associated with one indexing item;
affixing a second text identifier adjacent to a second body of text, the second body of text included in the physical collection of text, the second text identifier comprises a second iconography;
affixing a second page identifier adjacent to a second page included in the physical collection of text, the second page includes the second body of text, the second page identifier comprises the second iconography, the second iconography is not the first iconography; and
modifying the list to comprise a second summary of the second body of text, the plurality of iconographies comprise the second iconography.

2. The method of claim 1, further comprising:
forming a first sheet, the first sheet comprises a plurality of the first text identifiers and a plurality of the second text identifiers;
enumerating the plurality of the first text identifiers to each correspond to one of the rows of the list; and
enumerating the plurality of the second text identifiers to each correspond to one of the rows of the list.

3. The method of claim 2, further comprising:
forming a second sheet, the second sheet to comprises a plurality of the first page identifiers and a plurality of the second page identifiers;
enumerating the plurality of the first page identifiers to each correspond to one of the rows of the list; and
enumerating the plurality of the second page identifiers to each correspond to one of the rows of the list.

4. The method of claim 3, further comprising forming the physical collection of text, the physical collection of text is a book or a periodical.

5. The method of claim 4, wherein forming the physical collection of text comprises forming the physical collection of text to include the first sheet, the second sheet, and the list.

6. The method of claim 5, wherein modifying the list to comprise the first summary of the first body of text comprises:
modifying a first row included in the rows, the first row associated with the first iconography, the first row comprises a first enumeration that corresponds to the first text identifier and the first page identifier.

7. The method of claim 6, wherein modifying the list to comprise the second summary of the second body of text comprises:
modifying a second row included in the rows, the second row associated with the second iconography, the second row comprises a second enumeration that corresponds to the second text identifier and the second page identifier.

8. A method for indexing and retrieving text, comprising:
affixing a first text identifier adjacent to a first body of text, the first body of text is included in a physical collection of text, the first text identifier comprises a first iconography;
affixing a first page identifier adjacent to a page included in the physical collection of text, the page includes the particular body of text, the first page identifier comprises the first iconography;
modifying a list to comprise a first summary of the first body of text, the list comprises a table of cells arranged into rows and columns, each of the rows is associated with one of a plurality of iconographies, the plurality of iconographies comprise the first iconography, each iconography is associated with one indexing item;
affixing a second text identifier adjacent to a second body of text, the second body of text included in the physical collection of text, the second text identifier comprises a second iconography;
affixing a second page identifier adjacent to a second page included in the physical collection of text, the second page includes the second body of text, the second page identifier comprises the second iconography, the second iconography is not the first iconography; and
modifying the list to comprise a second summary of the second body of text, the plurality of iconographies comprise the second iconography.

9. The method of claim 8, further comprising:
forming a first sheet, the first sheet comprises a plurality of the first text identifiers and a plurality of the second text identifiers;
enumerating the plurality of the first text identifiers to each correspond to one of the rows of the list; and
enumerating the plurality of the second text identifiers to each correspond to one of the rows of the list.

10. The method of claim 9, further comprising:
forming a second sheet, the second sheet to comprises a plurality of the first page identifiers and a plurality of the second page identifiers;
enumerating the plurality of the first page identifiers to each correspond to one of the rows of the list; and
enumerating the plurality of the second page identifiers to each correspond to one of the rows of the list.

11. The method of claim 10, further comprising forming the physical collection of text, the physical collection of text is a book or a periodical.

12. The method of claim 11, wherein forming the physical collection of text comprises forming the physical collection of text to include the first sheet, the second sheet, and the list.

13. The method of claim 12, wherein modifying the list to comprise the first summary of the first body of text comprises:
modifying a first row included in the rows, the first row associated with the first iconography, the first row comprises a first enumeration that corresponds to the first text identifier and the first page identifier.

14. The method of claim 13, wherein modifying the list to comprise the second summary of the second body of text comprises:
modifying a second row included in the rows, the second row associated with the second iconography, the second row comprises a second enumeration that corresponds to the second text identifier and the second page identifier.

15. A method for indexing and retrieving text, comprising:
affixing a first text identifier adjacent to a first body of text, the first body of text is included in a physical collection of text, the first text identifier comprises a first iconography;
affixing a first page identifier adjacent to a page included in the physical collection of text, the page includes the particular body of text, the first page identifier comprises the first iconography;
modifying a list to comprise a first summary of the first body of text, the list comprises a table of cells arranged into rows and columns, each of the rows is associated with one of a plurality of iconographies, the plurality of iconographies comprise the first iconography, each iconography is associated with one indexing item;
affixing a second text identifier adjacent to a second body of text, the second body of text included in the physical collection of text, the second text identifier comprises a second iconography;
affixing a second page identifier adjacent to a second page included in the physical collection of text, the second page includes the second body of text, the second page identifier comprises the second iconography, the second iconography is not the first iconography;
modifying the list to comprise a second summary of the second body of text, the plurality of iconographies comprise the second iconography;
forming a first sheet, the first sheet comprises a plurality of the first text identifiers and a plurality of the second text identifiers;
enumerating the plurality of the first text identifiers to each correspond to one of the rows of the list; and
enumerating the plurality of the second text identifiers to each correspond to one of the rows of the list.

16. The method of claim 15, further comprising:
forming a second sheet, the second sheet to comprises a plurality of the first page identifiers and a plurality of the second page identifiers;
enumerating the plurality of the first page identifiers to each correspond to one of the rows of the list; and
enumerating the plurality of the second page identifiers to each correspond to one of the rows of the list.

17. The method of claim 16, further comprising forming the physical collection of text, the physical collection of text is a book or a periodical.

18. The method of claim 17, wherein forming the physical collection of text comprises forming the physical collection of text to include the first sheet, the second sheet, and the list.

19. The method of claim 18, wherein modifying the list to comprise the first summary of the first body of text comprises:

modifying a first row included in the rows, the first row associated with the first iconography, the first row comprises a first enumeration that corresponds to the first text identifier and the first page identifier; and modifying a second row included in the rows, the second row associated with the second iconography, the second row comprises a second enumeration that corresponds to the second text identifier and the second page identifier.

\* \* \* \* \*